April 13, 1954
W. HERBERT ET AL
2,675,412
METHOD FOR THE RECOVERY OF SOLVENTS FROM WASTE
GASES RESULTING IN EXTRACTION PROCESSES
Filed Oct. 25, 1950
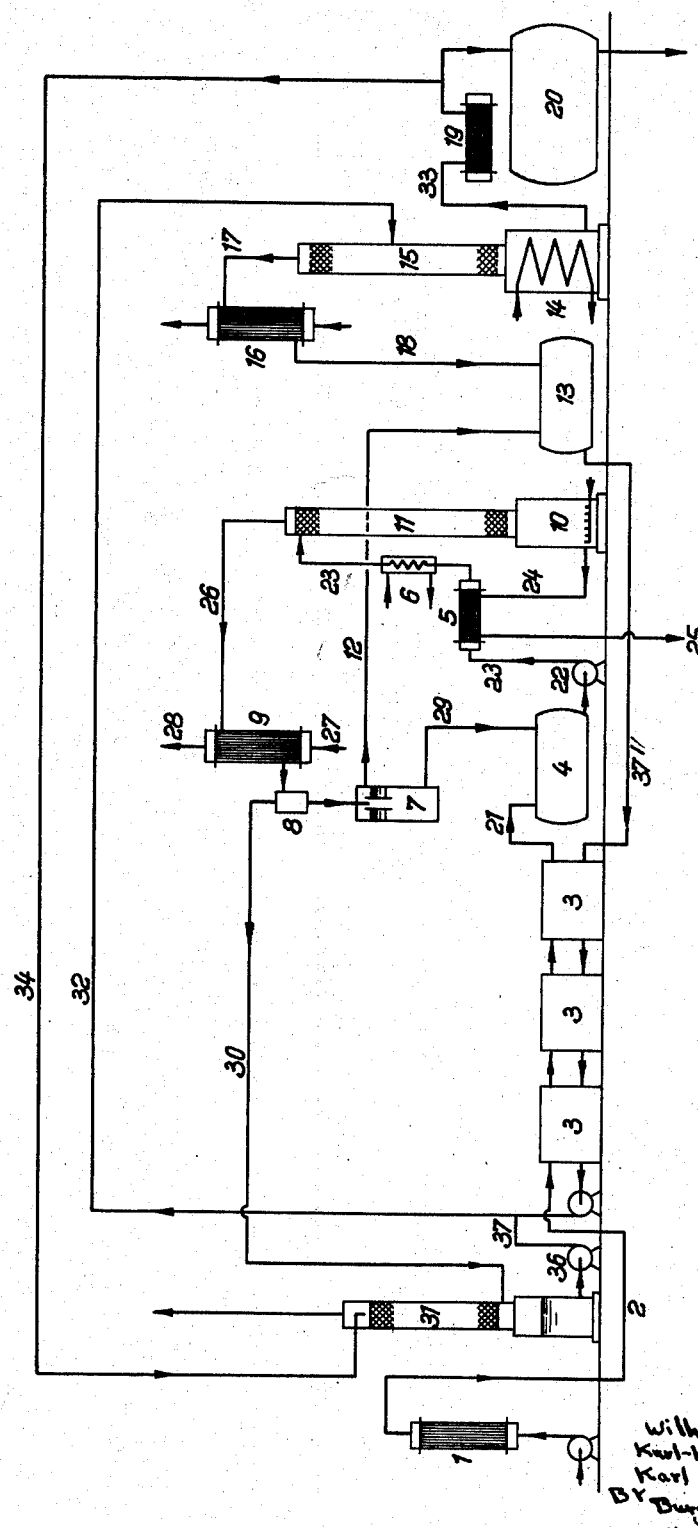
Inventors
Wilhelm Herbert
Karl-Heinz Eisenlohr
Karl Grob
BY Burgess & Dinklage
Attorneys Patented Apr. 13, 1954

2,675,412

UNITED STATES PATENT OFFICE 2,675,412

METHOD FOR THE RECOVERY OF SOLVENTS FROM WASTE GASES RESULTING IN EXTRACTION PROCESSES

Wilhelm Herbert, Karl-Heinz Eisenlohr, and Karl Grob, Frankfurt am Main, Germany, assignors to Metallgesellschaft Aktiengesellschaft, Frankfurt am Main, Germany, a corporation of Germany Application October 25, 1950, Serial No. 192,032

Claims priority, application Germany October 31, 1949

5 Claims. (Cl. 260—627)

The invention relates to a method for the recovery of solvents from waste gases resulting from extraction processes.

In the extraction of valuable substances, such as phenols, fatty acids, as for example caproic acid and caprylic acid, alcohols, as for example isoamyl alcohol, hexyl alcohol, heptyl alcohol, isohexyl alcohol, secondary hexyl alcohol, isoheptyl alcohol, and secondary heptyl alcohol, organic bases as for example pentyl amine and hexyl amine, or the like, from waters or aqueous solutions by means of organic solvents and preferably oxygenous solvents having a boiling point below 180° C. as for example butyl acetate, amyl acetate and propyl acetate, a part of the solvent remains in the aqueous medium after the separation of the solvent charged with the extracted substances. Other examples of suitable solvents are benzene or benzol, organic esters, ethers, as for example dipropyl ether, dibutyl ether, and methyl propyl ether, ketones as for example methyl ethyl ketone and diethyl ketone, or the like, which are not soluble or not easily soluble in the liquids to be extracted. The residual solvents are recovered from the extracted aqueous medium by distillation or by flashing off, if the process had been carried out under pressure, or by application of vacuum or the like. In recovering the solvent from the extracted waters, gases which had been dissolved in the extracted waters are simultaneously set free. Larger or smaller quantities of the solvent pass into these gases.

It is an object of the present invention to provide an improved process of recovering the solvent.

With this object in view according to the present invention the solvent is recovered from such gases by washing the gases with extracted substances obtained from the extracted aqueous liquids, e. g., in case of the extraction of phenol from water, with the raw phenols obtained by extraction.

It has been found that these extract substances are excellent absorbing agents for the recovery from the waste gases of the vapors of the extracting agents used. They are capable of absorbing from the gases up to 50 percent and more of their weight of extracting agents. Accordingly only relatively small quantities of extract substances are required for recovering the solvents passing over into the waste gases, while hitherto it was necessary to wash the waste gases in a washing tower with the whole quantity of the liquid to be extracted, e. g. water resulting from carbonization or coking. The mixture of solvent and extracting products obtained by the process according to the invention can be processed together with the extract, without causing a substantial additional load in the extract distillation plant in which the separation of the extract into solvent and extracted substances is carried out.

For instance, if phenols or the like are extracted by means of organic esters such as butyl acetate, from waters derived from the dry distillation of carbonaceous matter coking waters or the like, the plant as shown by way of example and diagrammatically in the drawing can be used with good success for recovering the solvent from the waste gases produced in the plant.

Referring to the drawing, 1 is a cooler in which the hot phenol-containing water is cooled down to about 30 to 35° C. The cooled water then passes through the pipe 2 to a three-stage counter-current extraction apparatus 3. The extracted water flows through the pipe 21 into the intermediate tank 4 and is forced by the pump 22 through the ducts 23, the heat exchanger 5 and the preheater 6 into the distilling column 11, direct steam is introduced into base 10 of column 11 for heating the same. From the still base 10 the heated water flows through the duct 24 into the heat exchanger 5, where the heat of the water is transferred to the water fed through duct 23, the extracted water being discharged in a cooled condition through the duct 25. The gases and vapors escaping from the column 11 flow through the pipe 26 into the condenser 9, where the solvent and steam are condensed from the gases. 27 is the cooling water feed duct, 28 the cooling water discharge duct of the condenser 9. The condensate from the condenser 9 is now passed through the apparatus 8 in which liquid and gases are separated from each other in known manner, to the separator 7, in which the water is separated from the solvent. The solvent is passed through the pipe 12 into the reservoir 13, while the solvent-containing water is passed through the pipe 29 to the extracted and solvent-containing water in the reservoir 4. The gases which have been separated from the condensate in the apparatus 8 now flow through the pipe 30 into the washing tower 31.

The solvent charged with the extracted substances is passed through the pipe 32 to the distilling column 15 of a known construction. The solvent vapors distilled off in the column are passed through the pipe 17 into the condenser 16 where they are liquified, the condensate being returned through the pipe 18 into the reservoir 13. From the still 14 of the column 15 the phenols freed from the solvent are passed through the pipe 33 and the cooler 19 to the carbolic acid or phenol tank 20, for further treatment or use in known manner. A part of the phenols is fed, through the duct 34, to the washing tower 31, as a washing agent. In the washing tower the phenols absorb the solvent from the waste gases. They are then conveyed by the pump 36 through the duct 37 into the duct 32 through which they are supplied together with the extract-containing solvent coming from the extraction plant, to the distilling column 15. From the reservoir 13 the recovered solvent is recycled through the duct 37' into the extraction plant.

For instance, waste waters occurring in the carbonization of Middle German lignite and containing about 15 grams of phenol substances per liter, are treated with 100 liters of butyl acetate per cubic meter of carbonization water in the three-stage extraction plant 3. The solvent which has absorbed about 15 kgs. of phenol per 100 liters is separated in the distilling column 15 into solvent and raw phenol. 10 percent of the raw phenols obtained, i. e., 1.5 kgs. are used for washing the waste gases in the tower 31. The quantity of the waste gases which consist of carbon dioxide and sulphuretted hydrogen, amounts to about 4 cubic meters at a temperature of 0° C. and a pressure of 760 mm. of mercury for each cubic meter of carbonization water. About 100 gms. of butyl acetate are contained in a normal cubic meter of waste gas. The butyl acetate is washed out of the gas in the washing tower 31 down to 0.04 gram per normal cubic meter (i. e. to 99.96%). The washing agent flowing off from the washing tower consists of about 80 percent of raw phenol and 20 percent by weight of butyl acetate. This mixture is processed together with the solvent in the distilling apparatus 15.

The recovery of the vapors of the extracting agent contained in the waste gases will be carried out in a similar manner where other extracting agents are used, and it is also possible to treat the waste gases of other extraction processes according to the scheme as described in the example, the waste gases resulting in the recovery of the solvent also being washed with the extracted substances. The latter may be processed together with the charged solvents in a similar manner.

As indicated in the foregoing it is desirable and of advantage to pass the solvent extract into the still, such as is represented by the distillation column 15, at a point at which the concentration of solvent and extracted material within the distillation column approximately corresponds to the concentration of solvent and extracted material, admitted to the column and the still.

Taking for example a phenol-butyl acetate extract of 20-80% (by weight) ratio, as it may be derived in the phenol extraction from an aqueous medium, the extract is preferably added to the distillation column at a point at which the vapors therein have a concentration of about 20% by weight of phenol, and 80% by weight of butyl acetate. This would correspond to a point somewhat above the medial portion of the column.

If on the other hand an 80-20% phenol-butyl acetate extract is supplied to the column, the extract being for instance obtained in the solvent recovery from waste gases in accordance with the invention, the extract is admitted at a point of the distillation column at which a similar concentration prevails for the vapors within the column. This would correspond to a point relatively close to the base of the distillation column. It is possible to introduce the normal solvent extract and the waste gas recovery extract at different points of the distillation column corresponding respectively to the concentrations of the extracts. Alternatively both the regular solvent extract and the solvent recovery extract may be combined and then added at a single point of the distillation column at which the concentration of the vapors corresponds to the concentration of the combination of these extracts.

What is claimed is:

1. In the method for the extraction of phenols from phenol containing waste waters by contacting the waste water with an organic solvent having a substantially low solubility in water, separating the organic solvent containing extracted phenol from the waste water, separating the extracted phenol from the organic solvent and recovering the residue organic solvent from the waste water by distillation and condensation of solvent and water, the improvement for the recovery of residue organic solvent from carbon dioxide and hydrogen sulfide containing gases obtained from the distillation after the condensation which comprises intimately contacting such a carbon dioxide hydrogen sulfide containing gas with at least a portion of the extracted phenols for the absorption of organic solvent from the gases, and recovering the absorbed organic solvent from the extracted phenols after said contacting.

2. Improvement according to claim 1, in which the extracted phenol after said contact with said carbon dioxide and hydrogen sulfide-containing gas is added to the solvent extract from the phenol extraction prior to said organic solvent recovery.

3. Improvement according to claim 2, in which said organic solvent recovery is effected by distillation and in which at least one of said solvent extract and said extracted phenol after said contacting of extracted phenol with said carbon dioxide and hydrogen sulfide-containing gases is admitted at a point in said distillation at which the concentration of the extract approximately corresponds to the concentration of the distilling vapors.

4. Improvement according to claim 1, in which the extracted phenol after said contacting with carbon dioxide hydrogen sulfide-containing gases is added to solvent extract from the phenol extraction, and in which said organic solvent recovery is effected by distillation, the joint extract being added to the distillation at a point at which the concentration of the joint extract approximately corresponds to the concentration of the distilling vapors.

5. Improvement according to claim 1, in which said organic solvent is an organic solvent having a boiling point below 180° C.

References Cited in the file of this patent

UNITED STATES PATENTS

| Number | Name | Date |
|---|---|---|
| 2,199,786 | Dierichs et al. | May 7, 1940 |
| 2,305,248 | Fleer et al. | Dec. 15, 1942 |

FOREIGN PATENTS

| Number | Country | Date |
|---|---|---|
| 463,905 | Great Britain | Apr. 8, 1937 |